US007228304B1

(12) United States Patent
Wong et al.

(10) Patent No.: US 7,228,304 B1
(45) Date of Patent: Jun. 5, 2007

(54) METHOD AND SYSTEM FOR IMPLEMENTING AN EXTENSIBLE AUDIT TRAIL

(75) Inventors: Daniel M. Wong, South San Francisco, CA (US); Chon Hei Lei, San Leandro, CA (US); Thomas F. Keefe, South San Francisco, CA (US); Vipin Samar, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 427 days.

(21) Appl. No.: 10/349,254

(22) Filed: Jan. 21, 2003

(51) Int. Cl.
*G06F 17/30* (2006.01)
(52) U.S. Cl. ............ 707/10; 707/104.1; 709/203; 709/219
(58) Field of Classification Search .......... 707/1, 707/100, 10, 104.1; 709/203, 219
See application file for complete search history.

(56) References Cited

U.S. PATENT DOCUMENTS

2002/0165724 A1* 11/2002 Blankesteijn .......... 705/1

OTHER PUBLICATIONS

Power, D. et al. "A relational approach to the capture of DICOM files for Grid-enabled medical imaging databases" *Proceedings of the 2004 ACM Symposium on Applied Computing*, Nicosia, Cyprus (Mar. 14-17, 2004) pp. 272-279.

Ray, W.J. et al. Optimizing Systems by Work Schedules (A Stochastic Approach) *Proceedings of the 3rd Int'l Workshop on Software and Performace*, Rome, Italy (Jul. 24-26, 2002) pp. 75-82.

Rosenthal, A. and Winslett, M. "Security of Shared Data in Large Systems: State of the Art and Research Directions" *Proceedings of the 2004 ACM SIGMOD Int'l Conference on Management of Data*, Paris, France (Jun. 13-18, 2004), 3 pgs.

Shaw, M. "Architectural Issues in Software Reuse: It's Not Just the Functionality It's the Packaging" *Proceedings of the 1995 Symposium on Software Reusability*, Seattle, Washington, USA (Aug. 1995) 20(SI):3-6.

Templeton, M. et al. "InterViso: Dealing With the Complexity of Federated Database Access" *VLDB Journal* (Apr. 1995) 4(2):287-317.

Tyrelle, G.D. and King, G.C. "A Platform for the Description, Distribution and Analysis of Genetic Polymorphism Data" *Proceedings of the 1st Asia-Pacific Bioinfomatics Conference*, Adelaide, Austrailia (Jan. 2003), vol. 19, 8 pgs.

* cited by examiner

*Primary Examiner*—Leslie Wong
(74) *Attorney, Agent, or Firm*—Bingham McCutchen LLP (57) ABSTRACT

A method and system for implementing an extensible audit trail for electronic and computerized systems is disclosed. A defined audit ID is assigned to a given activity, and that audit ID is distributed along with each jump between systems when performing the activity. In addition, a set of mandatory attribute information is recorded at each system involved in the activity. Each system may also record a set of system specific attribute information. During the audit process, records are searched and collected for the appropriate audit ID value.

58 Claims, 6 Drawing Sheets

METHOD AND SYSTEM FOR IMPLEMENTING AN EXTENSIBLE AUDIT TRAIL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files and records, but otherwise reserves all other copyright rights.

BACKGROUND AND SUMMARY

The invention relates to computer systems, and more particularly to a method and mechanism for implementing an extensible audit trail.

Many business and personal activities in the modern world result in interactions with computerized systems. Even the simplest activities may result in interactions with a varied chain of interrelated computerized systems. In many cases, a first computerized system may jump to one or more other computerized systems or "hubs" to perform a requested activity. For example, a consumer performing the activity of making a purchase at a store may result in a first operation at a cashier computing system, which interacts with an inventory tracking system as well as a credit card authorization system, with the credit card authorization system interacting with the banking system for the consumer's credit card issuer, with the banking system interacting with one or more back-end database systems that track the consumer's account balance and credit limit, etc.

It is often desirable to allow auditing operations to be performed against these computerized interactions. Such auditing operations will attempt to obtain and correlate the set of interrelated records resulting from a given activity or set of activities. This type of auditing is particularly useful for businesses that seek to investigate cases of error, crime, or fraud that occur against computerized systems, e.g., to investigate improper or illegal credit card use.

A significant hurdle faced by most organizations seeking to perform auditing operations is that different systems may record information about events or operations in many different ways and in many different data formats. Moreover, the set of information that is recorded may differ from system to system. In addition, it may be difficult or impossible to correlate the information from the different systems to a related activity or set of activities, since multiple jumps between systems may result in loss of information about the original requestor for the activity.

Accordingly, the present invention provides a method and system for implementing an extensible audit trail for electronic and computerized systems. In one embodiment, a defined audit ID is assigned to a given activity, and that audit ID is distributed along with each jump between systems when performing the activity. In addition, a set of mandatory attribute information is recorded at each system involved in the activity. Each system may also record a set of system specific attribute information. During the audit process, records are searched and collected for the appropriate audit ID value. Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention. The same or similar elements in the figures may be referenced using the same reference numbers.

DETAILED DESCRIPTION

The present invention provides a method and system for implementing an extensible audit trail for electronic and computerized systems. In one embodiment, the invention comprises a method for propagating identification information across a distributed system or set of systems for an activity. A predefined set of attributes and optional set of system-dependent attributes are recorded at each system or node related to an operation performed for the activity.

Figure 1:
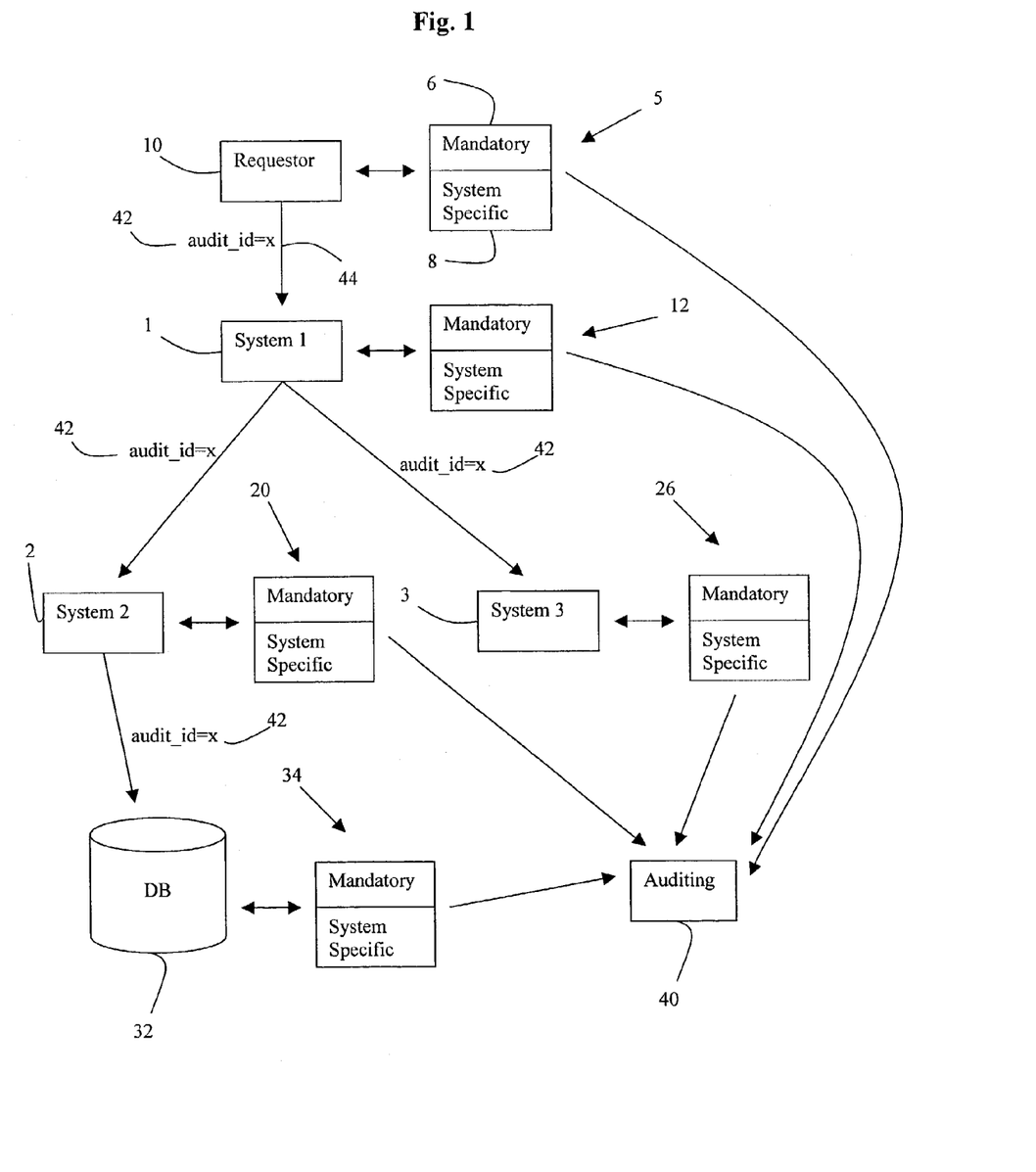
FIG. 1 shows an interconnected group of distributed nodes.

To illustrate an embodiment of the invention, FIG. 1 shows a diagram of a set of interrelated computing systems. System 10 corresponds to the originator of an activity request. According to an embodiment of the invention, when a distinct activity is initiated at system 10, an uniquely identifiable audit ID value is generated for that activity. In one approach, the audit ID serves to identify the origin user and activity. When an audit event occurs at system 10, audit information is recorded in an audit log 5 associated with system 10. The audit record recorded for a particular audit event identifies the audit ID value that is associated with that event.

To perform the requested activity, system 10 may need to interact with other distributed systems or nodes. To further act upon the requested activity, these other systems and nodes, may themselves interact with other distributed systems and nodes. This chain of interrelated systems and nodes may extend indefinitely.

The audit ID value for the activity is propagated through this chain of related systems and nodes. As each system or node performs or undergoes an audit event related to the activity of interest, audit information is recorded in the audit log associated with each distributed system or node in which the audit information identifies the propagated audit ID value.

In the example of FIG. 1, system 10 interacts with system 1 to perform the activity of interest. The unique audit ID value 42 for the activity of interest is propagated from system 10 to system 1. As system 1 undergoes an audit event related to the activity, one or more audit records are recorded in audit log 12, with each audit record identifying the propagated audit ID value.

To respond to its portion of the requested activity, system 1 interacts with system 2 and system 3. This type of interaction may, for example, be a request for information or action at systems 2 or 3 that is needed by system 1 in order for system 1 to performed its portion of the activity. It is noted that in conventional systems, this circumstance may cause the identity of the original activity requestor from system 10 to be obscured at systems 2 and 3. This is because systems 2 and 3 may be configured such that only system 1 is recognized as the originator of their portion of the activity request, and therefore any audit records maintained at systems 2 or 3 may not properly identify system 10 as the original source of the request. This makes it difficult or impossible for auditing operations to properly correlate related records across distributed systems In the present embodiment of the invention, the appropriate audit ID value is propagated by system 1 to systems 2 and 3 along with its request for information or action. Each distributed system may have its own designated set of audit events. As system 2 and 3 undergoes or performs an audit event related to the activity of interest, one or more audit records are recorded in the respective audit logs 20 and 26, with each audit record identifying the propagated audit ID value. In this manner, it is now possible to precisely identify the specific audit records related to a particular activity, user, or operation, even if the related audit events extend across a chain of multiple distributed systems.

In one embodiment, the audit records at each system or node is recorded in a common data schema. The common data schema will include a set of mandatory attributes 6. Each system or node will be required or requested to provide audit information for each mandatory attribute. Examples of mandatory attributes in an embodiment include a session identifier, entry identifier, action identifier, and timestamp. The specific combination of mandatory attributes will vary depending upon the specific implementation of the systems to which the invention is directed.

In addition, each system or node will be permitted to record a set of system specific attributes 8 in the audit record. The system specific attributes will allow each system to record audit information that is believed to be necessary to track audit events for its specific actions or activities.

In an embodiment, the common schema is an XML-based schema. One reason for using an XML-based schema is because XML has become a widely-accepted standard for storing, formatting, and presenting information. Thus, it is likely that many or most of the systems and nodes in a distributed environment is equipped to operate using the XML standard. Moreover, this allows a single XML-compliant tool to be able to access and view auditing information stored at each of the respective nodes in the distributed environment. In addition, XML can be used even if the distributed systems and nodes are not RDBMS or database systems. The following is an example XML-based schema that can be used to implement an embodiment of the invention:

```
<ROWSET>
  <ROW>
    <SESSIONID>121</SESSIONID>
    <ENTRYID>1</ENTRYID>
    <STATEMENT>1</STATEMENT>
    <TIMESTAMP_x0023_>08-MAY-02</TIMESTAMP_x0023_>
    <USERID>WRONG</USERID>
    <ACTION_x0023_>100</ACTION_x0023_>
    <RETURNCODE>1017</RETURNCODE>
    <COMMENT_x0024_TEXT>Authenticated by:
DATABASE</COMMENT_x0024_TEXT>
    <SPARE1>dcwang</SPARE1>
  </ROW>
  <ROW>
    <SESSIONID>120</SESSIONID>
    <ENTRYID>1</ENTRYID>
    <STATEMENT>1</STATEMENT>
    <TIMESTAMP_x0023_>08-MAY-02</TIMESTAMP_x0023_>
    <USERID>SCOTT</USERID>
    <ACTION_x0023_>101</ACTION_x0023_>
    <RETURNCODE>0</RETURNCODE>
    <LOGOFF_x0024_LREAD>35</LOGOFF_x0024_LREAD>
    <LOGOFF_x0024_PREAD>0</LOGOFF_x0024_PREAD>
    <LOGOFF_x0024_LWRITE>11</LOGOFF_x0024_LWRITE>
    <LOGOFF_x0024 DEAD>0</LOGOFF_x0024 DEAD>
    <LOGOFF_x0024_TIME>08-MAY-02</LOGOFF_x0024 TIME>
    <COMMENT_x0024_TEXT>Authenticated by:
DATABASE</COMMENT_x0024_TEXT>
    <SPARE1>dcwang</SPARE1>
    <PRIV_x0024_USED>5</PRIV_x0024_USED>
    <SESSIONCPU>3</SESSIONCPU>
    <SCN>453678564</SCN>
    <AUDITID>3ACF47F3A56CBA7D4</AUDITID>
  </ROW>
</ROWSET>
```

Figure 2:
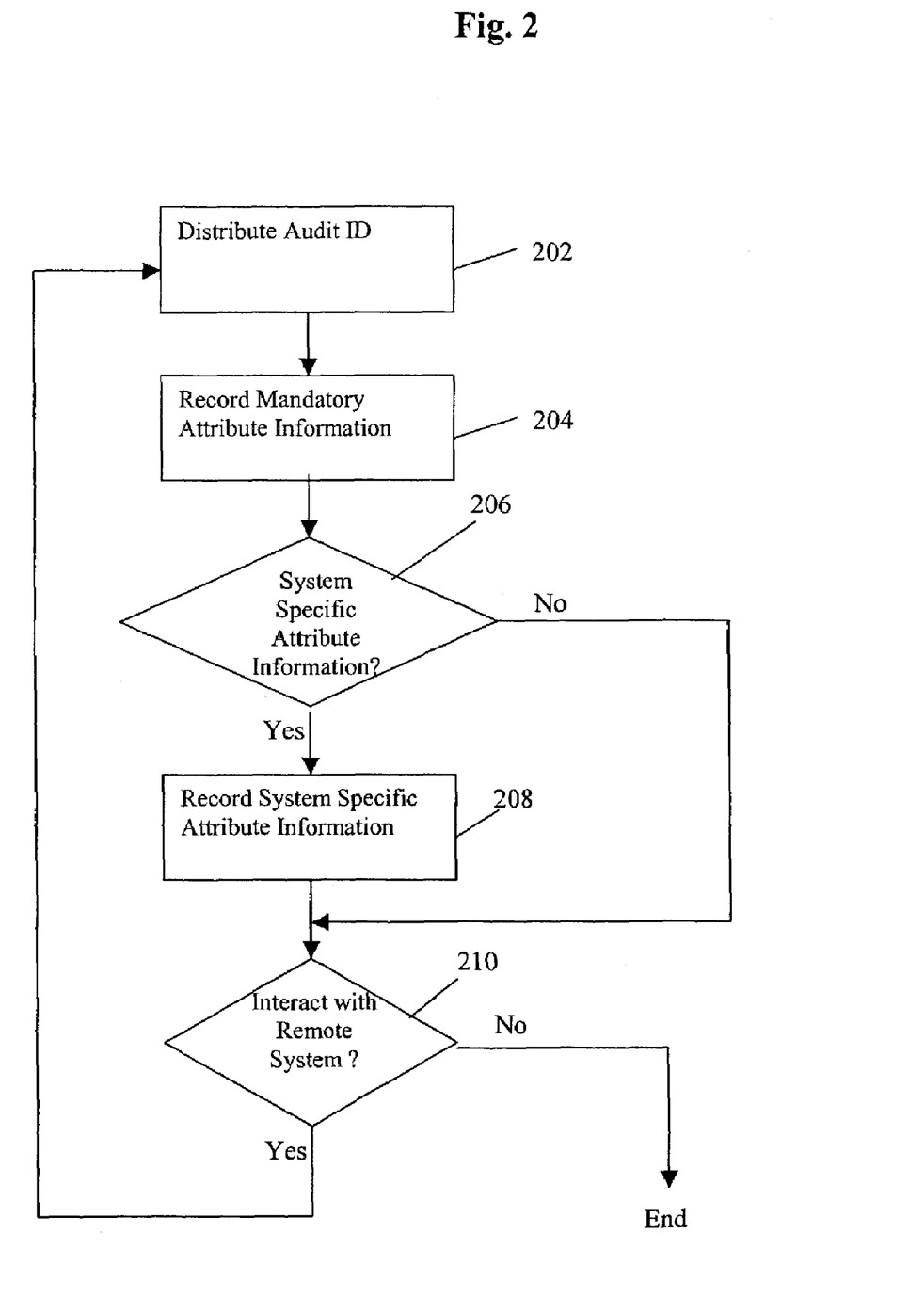
FIG. 2 shows a flowchart of a process for implementing an extensible audit trail according to an embodiment of the invention.

FIG. 2 shows a flowchart of a process for implementing an extensible audit trail according to an embodiment of the invention. At 202, an audit ID value is distributed within a system. As noted above, if an activity relates to audit event across multiple distributed systems or nodes, then the audit ID value for that activity is also propagated to the respective systems and nodes. At each system or node in which an audit event takes place, an audit record is recorded for that audit event. It is noted that an audit record may be stored anywhere, e.g., within the system itself or in an external audit log. The exact configuration for the audit log can vary. For example, each system may be associated with its own dedicated audit log, each set of one or more applications may be associated with dedicated audit logs, or an audit log may be shared between multiple systems, nodes, or applications.

Mandatory attribute information, such as the audit ID value, is recorded in the audit record (204). At 206, a determination is made whether system specific information is to be recorded in the audit record. If so, then the requisite system specific information for the audit event is recorded (208). If the activity causes the present system to chain to another system, then the process repeats at the chained system (210).

When an audit is performed, correlation of audit records within the distributed audit logs can be performed by identifying and searching for the appropriate audit ID value(s). Referring back to FIG. 1, auditing is performed from an auditing system 40. The distributed audit logs 5, 12, 20, 26, and 34 are accessed to identify relevant audit records for the activity or user of interest. These records are then retrieved and reviewed by the XML-compliant audit viewing tool at auditing system 40, e.g., an XML-compliant browser.

Figure 3:
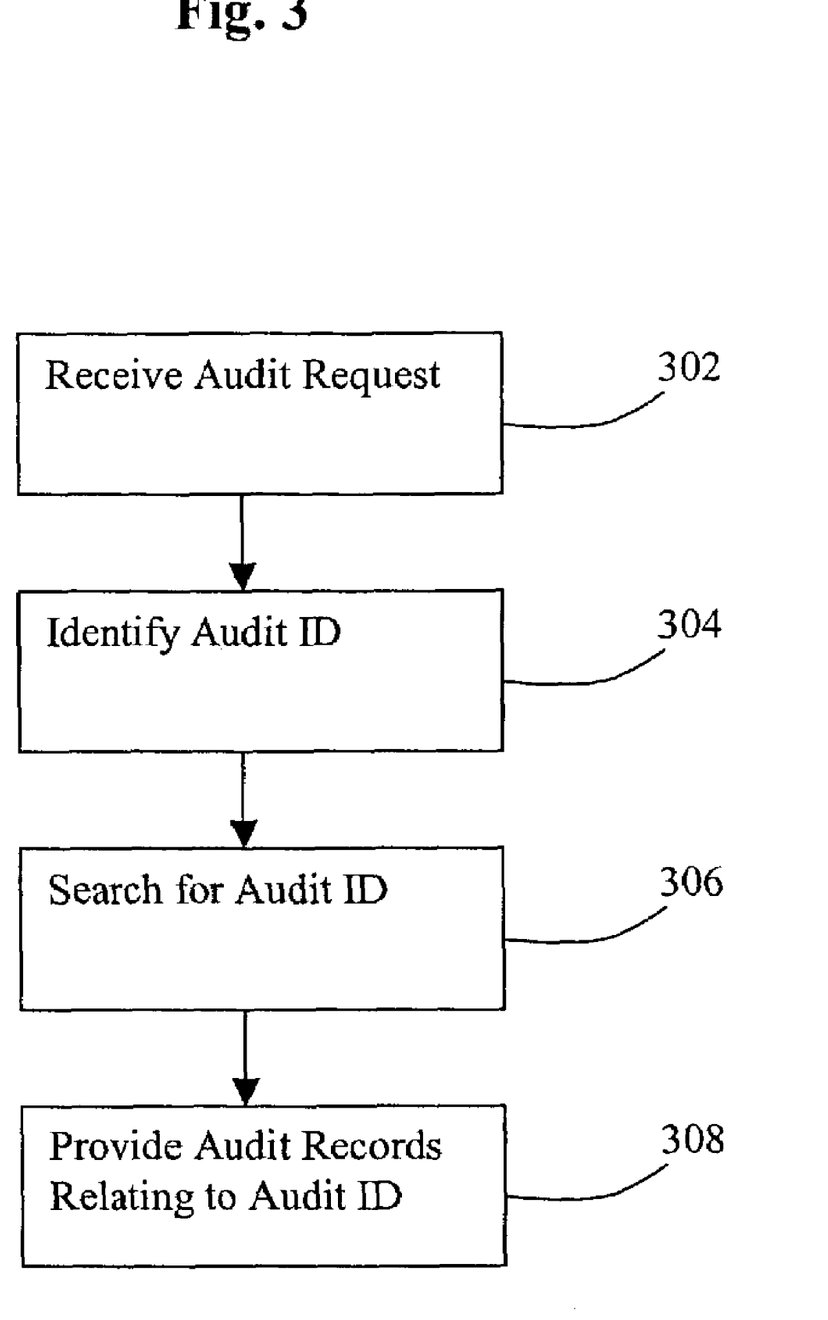
FIG. 3 shows a flowchart of a process for accessing an audit trail according to an embodiment of the invention.

FIG. 3 shows a flowchart of a process for performing an audit according to an embodiment of the invention. At 302, an audit request is received. The audit request provides information that can be used to identify a specific audit ID value(s). For example, the audit request may identify a user, event, action, or session that is associated with a particular audit ID value. Based upon this information, the audit ID value or values relevant to the audit are identified (304). At 306, the distributed audit records are searched to identify the specific audit records related to the identified audit ID value. These identified audit records are thereafter retrieved for processing by the auditing tool (308).

Figure 4:
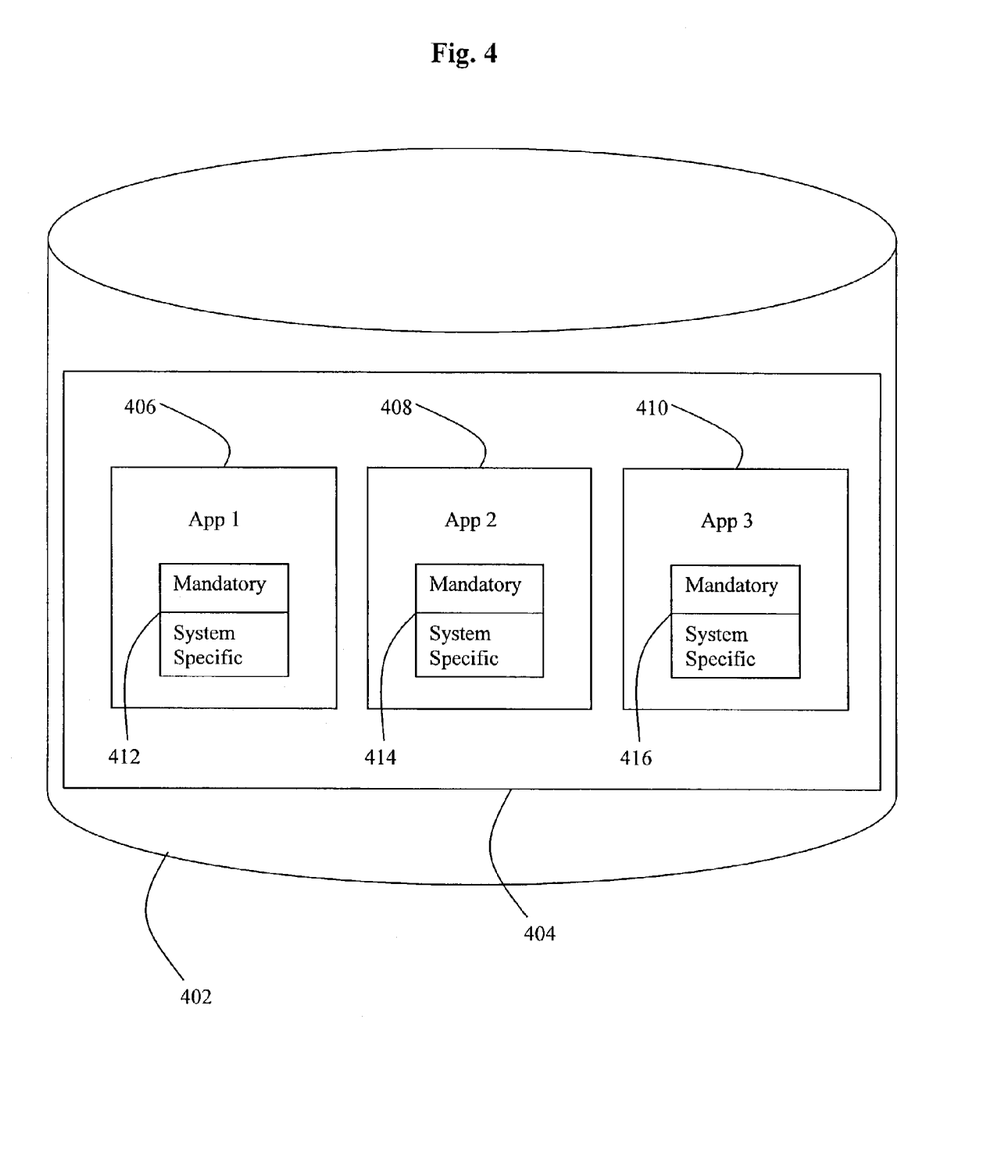
FIG. 4 shows a structure for storing audit trail information according to an embodiment of the invention.

FIG. 4 illustrates an architecture for securely and efficiently implementing audit records according to an embodiment of the invention. In this figures, shown is a database 402 (although the disclosed technique may be applied to any node, and not necessarily to a database node). One or more namespaces or contexts 406, 408, and 410 are allocated within a storage area 404, e.g., in system memory.

Each context is associated with one or more applications. Thus, context 406 is associated with a first set of one or more applications, context 408 is associated with a second set of one or more applications, and context 410 is associated with a third set of one or more applications. Whenever an application so designated is involved with an audit event, the system initiates a procedure whereby an audit record is recorded in the appropriate context area for that application. In this example, if the audit event is related to the first set of applications, then an audit record 412 is recorded in context 406. Similarly, if the audit event is related to the second or third sets of applications, then audit records 414 or 416 are recorded in contexts 408 or 410, respectively.

Figure 5:
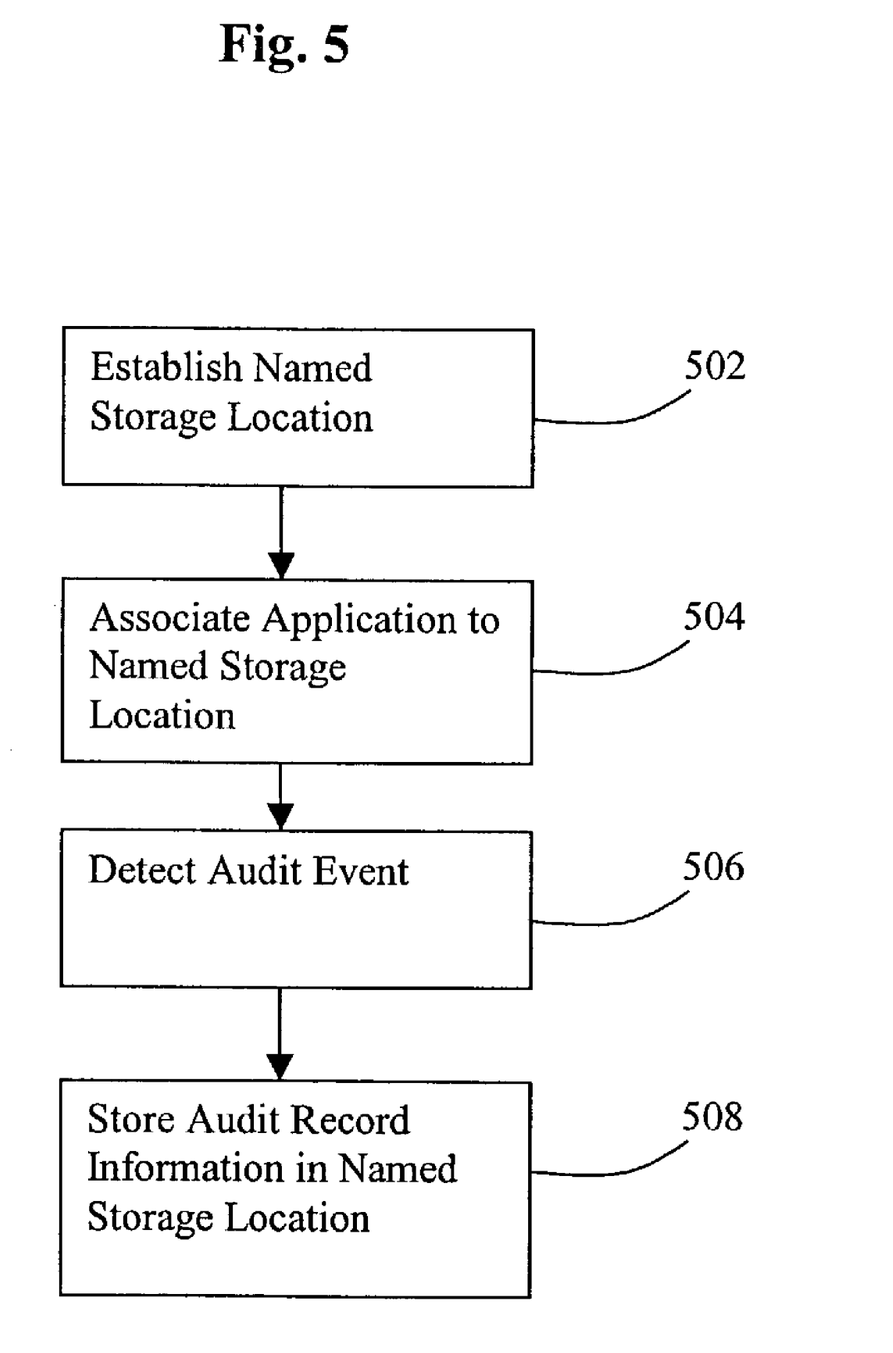
FIG. 5 shows a flowchart of a process for storing audit trail information according to an embodiment of the invention.

FIG. 5 shows a flowchart of a process for storing an audit record according to an embodiment of the invention. At 502, a named storage location is established for a set of one or more applications. As noted above, the named storage area could comprise a namespace or context. A set of one or more applications are associated with the named storage location at 504. At 506, an audit event is detected that is associated with an application from within the set of one or more applications identified in 504. When this audit event is identified, an appropriate audit record is stored in the named storage location (508).

In an embodiment, when an audit event is detected, all audit attribute values are automatically inserted into the appropriate namespace or context in an extensible CLOB (character large object) column in key/value pair format. The key refers to the information attribute or category and the value refers to the value of that attribute or category. Alternatively, the user or system registers application specific XML schema to be used and a database implementation is employed whereby the XML schema for that column is dynamically enforced. This type of dynamic enforcement of an XML schema is available using the XMLType column available using the Oracle 9i database management product available from Oracle Corporation of Redwood Shores, Calif. When analyzing the audit trail, the relational audit trail can be exposed as an XML document using the DBMS_XMLGEN package available from Oracle Corporation. The CLOB or XML-compliant column can be loaded as an XML element for drill down by any XML-compliant tool.

System Architecture Overview

Figure 6:
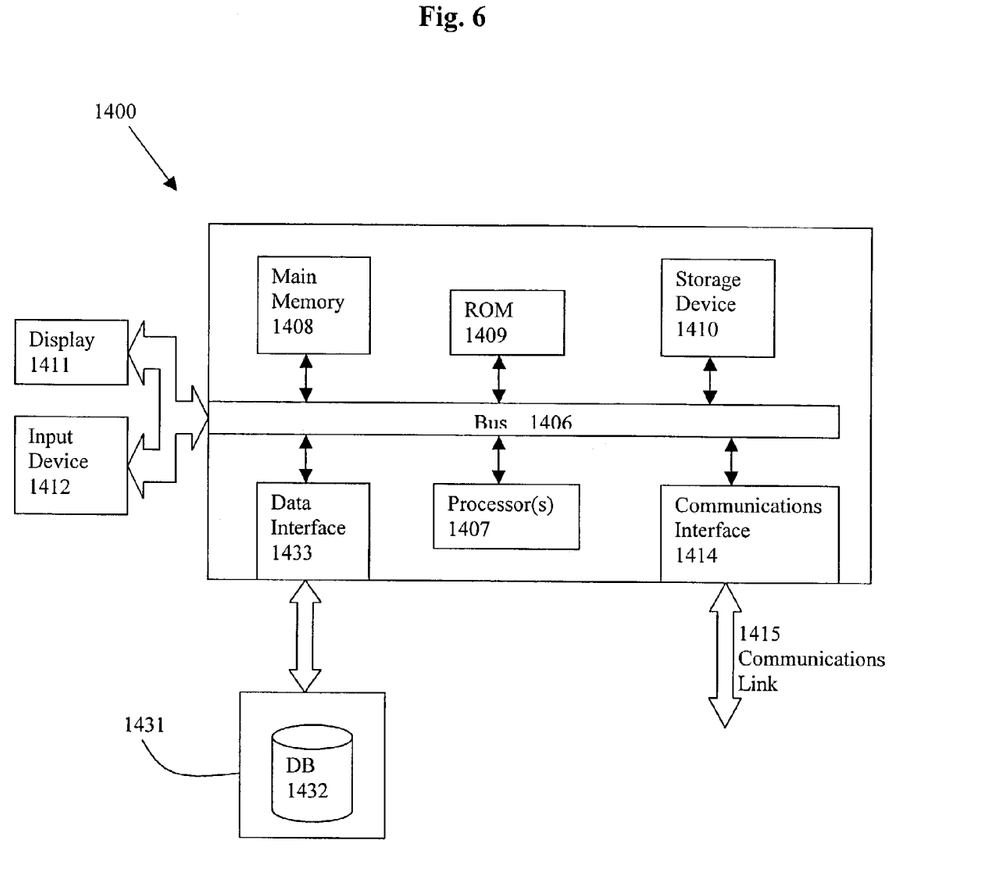
FIG. 6 is a diagram of a computer system with which the present invention can be implemented.

The execution of the sequences of instructions required to practice the invention may be performed in embodiments of the invention by a computer system 1400 as shown in FIG. 6. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

A computer system 1400 according to an embodiment of the invention will now be described with reference to FIG. 6, which is a block diagram of the functional components of a computer system 1400 according to an embodiment of the invention. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A computer-implemented method for implementing an extensible audit trail, comprising:
   propagating an audit ID value from a first node to a second node, the first node and the second node interrelated based upon related activity;
   recording a first audit record at the first node with the audit ID value for a first audit event that is associated with the related activity, the first audit event occurring at the first node;
   recording a second audit record at the second node with the audit ID value for a second audit event that is associated with the related activity, the second audit event occurring at the second node, wherein the first audit event is related to the second audit event;
   wherein the first and second audit records each comprise mandatory attribute information, and the audit ID value is for correlating the first audit record at the first node with the second audit record at the second node, to thereby allow an audit to be performed to obtain the first and second audit records that are resulted from the related activity.

2. The computer-implemented method of claim 1 in which the audit ID value is uniquely associated with the related activity.

3. The computer-implemented method of claim 1 in which the first and second audit records comply with a common schema.

4. The computer-implemented method of claim 3 in which the common schema is an XML-based schema.

5. The computer-implemented method of claim 3 in which the mandatory attribute information comprises information selected from the group consisting of session identifier, entry identifier, timestamp, user identifier.

6. The computer-implemented method of claim 1 in which the first audit record is recorded in a database.

7. The computer-implemented method of claim 6 in which a CLOB structure is employed to store the first audit record.

8. The computer-implemented method of claim 6 in which a database storage structure dynamically enforces a common schema for the first audit record.

9. The computer-implemented method of claim 1 in which a specially designated storage location is employed to store the first audit record.

10. The computer-implemented method of claim 9 in which the specially designated storage location is associated with a set of one or more applications, wherein the first audit event is related to the set of one or more applications.

11. The computer-implemented method of claim 9 in which the specially designated storage location comprises a context structure.

12. The computer-implemented method of claim 1 further comprising:
    auditing by accessing the first and second audit records.

13. The computer-implemented method of claim 12 in which the act of auditing comprises the act of searching for the first and second audit records based upon the audit ID value.

14. The computer-implemented method of claim 1 in which at least one audit record is recorded in a database.

15. The computer-implemented method of claim 14 in which the at least one audit record is stored using a CLOB structure.

16. The computer-implemented method of claim 14 in which a database storage structure dynamically enforces the common schema.

17. The computer-implemented method of claim 1, wherein the related activity comprises a first action at the first node and a second action at the first node, the first and second actions performed to accomplish the related activity.

18. A computer-implemented method for implementing an audit trail in a distributed system, comprising:
    propagating an audit ID value between nodes involved in an interrelated distributed activity, the nodes comprising a first node and a second node;
    recording a first audit record at the first node with the audit ID value for a first audit event, the first audit event occurring at the first node, the first audit record to be used for auditing the distributed activity;
    recording a second audit record at the second node with the audit ID value for a second audit event, the second audit event occurring at the second node, the second audit record to be used for auditing the distributed activity; and
    wherein the first audit event is related to the second audit event, and the audit ID value is adapted for correlating the first audit record at the first node with the second audit record at the second node, to thereby allow an audit to be performed to obtain the first and second audit records that are resulted from the interrelated distributed activity.

19. The computer-implemented method of claim 18 in which the audit ID value is uniquely associated with the interrelated distributed activity.

20. The computer-implemented method of claim 19 in which the audit ID value is propagated to every distributed node associated with the related activity.

21. The computer-implemented method of claim 18, wherein the related activity comprises a first action at the first node and a second action at the first node, the first and second actions performed to accomplish the related activity.

22. A computer-implemented method for implementing an audit trail in a distributed system, comprising:
  generating a common schema for recording audit records, the common schema comprising a set of mandatory attribute information and a variable set of system specific attribute information, the common schema further comprising an audit ID that is propagated across multiple nodes; and
  recording audit records for audit event at nodes in the distributed system, the audit records compliant with the common schema;
  wherein the audit ID is for correlating one of the audit records with another of the audit records, to thereby allow an audit to be performed to obtain the one of the audit records and the another of the audit records that are resulted from a related activity.

23. The computer-implemented method of claim 22 in which the common schema is an XML-based schema.

24. The computer-implemented method of claim 22 in which the mandatory attribute information comprises information selected from the group consisting of session identifier, entry identifier, timestamp, user identifier.

25. The computer-implemented method of claim 22, wherein the related activity comprises a first action at one of the multiple nodes and a second action at another of the multiple nodes, the first and second actions performed to accomplish the related activity.

26. A computer-implemented method for performing auditing in a distributed system, comprising:
  receiving an audit request to obtain a set of interrelated records that are resulted from a related activity;
  identifying an audit ID value associated with the audit request, the audit ID value propagated across a plurality of nodes that are interrelated based upon the related activity, in which audit events at the plurality of nodes that are associated with the related activity are recorded as audit records associated with the audit ID value; and
  performing an auditing operation by searching for the audit records that are associated with the audit ID value;
  wherein the related activity comprises a first action at one of the plurality of nodes and a second action at another of the plurality of nodes, the first and second actions performed to accomplish at least a part of the related activity.

27. The computer-implemented method of claim 26 in which the audit records are stored in an XML-based format and an XML-compliant tool is employed to access the audit records.

28. The computer-implemented method of claim 27 in which the XML-compliant tool comprises a browser.

29. The computer program product of claim 26 in which the audit records are stored in an XML-based format and an XML-compliant tool is employed to access the audit records.

30. A computer program product comprising a computer usable storage medium having executable code to execute a process for implementing an extensible audit trail, the process comprising:
  propagating an audit ID value from a first node to a second node, the first node and the second node interrelated based upon related activity;
  recording a first audit record at the first node with the audit ID value for a first audit event that is associated with the related activity, the first audit event occurring at the first node;
  recording a second audit record at the second node with the audit ID value for a second audit event that is associated with the related activity, the second audit event occurring at the second node, wherein the first audit event is related to the second audit event;
  wherein the first and second audit records each comprise mandatory attribute information, and the audit ID value is for correlating the first audit record at the first node with the second audit record at the second node, to thereby allow an audit to be performed to obtain the first and second audit records that are resulted from the related activity.

31. The computer program product of claim 30 in which the audit ID value is uniquely associated with the related activity.

32. The computer program product of claim 30 in which a specially designated storage location is employed to store the first audit record.

33. The computer program product of claim 32 in which the specially designated storage location is associated with a set of one or more applications, wherein the first audit event is related to the set of one or more applications.

34. The computer program product of claim 30 in which the process further comprises:
  auditing by accessing the first and second audit records.

35. The computer program product of claim 30, wherein the related activity comprises a first action at the first node and a second action at the first node, the first and second actions performed to accomplish the related activity.

36. A system for implementing an extensible audit trail, comprising:
  means for propagating an audit ID value from a first node to a second node, the first node and the second node interrelated based upon related activity;
  means for recording a first audit record at the first node with the audit ID value for a first audit event that is associated with the related activity, the first audit event occurring at the first node;
  means for recording a second audit record at the second node with the audit ID value for a second audit event that is associated with the related activity, the second audit event occurring at the second node, wherein the first audit event is related to the second audit event;
  wherein the first and second audit records each comprise mandatory attribute information, and the audit ID value is for correlating the first audit record at the first node with the second audit record at the second node, to thereby allow an audit to be performed to obtain the first and second audit records that are resulted from the related activity.

37. The system of claim 36 in which the audit ID value is uniquely associated with the related activity.

38. The system of claim 36 in which a specially designated storage location is employed to store the first audit record.

39. The system of claim 38 in which the specially designated storage location is associated with a set of one or more applications, wherein the first audit event is related to the set of one or more applications.

40. The system of claim 36 further comprising:
means for auditing that accesses the first and second audit records.

41. The system of claim 36, wherein the related activity comprises a first action at the first node and a second action at the first node, the first and second actions performed to accomplish the related activity.

42. A computer program product comprising a computer usable storage medium having executable code to execute a process for implementing an extensible audit trail in a distributed system, the process comprising:
generating a common schema for recording audit records, the common schema comprising a set of mandatory attribute information and a variable set of system specific attribute information; and
recording audit records for audit event at nodes in the distributed system, the audit records compliant with the common schema;
wherein the audit ID is for correlating one of the audit records with another of the audit records, to thereby allow an audit to be performed to obtain the one of the audit records and the another of the audit records that are resulted from a related activity.

43. The computer program product of claim 42 in which the common schema is an XML-based schema.

44. The computer program product of claim 42 in which the mandatory attribute information comprises information selected from the group consisting of session identifier, entry identifier, timestamp, user identifier.

45. The computer program product of claim 42, wherein the related activity comprises a first action at one of the multiple nodes and a second action at another of the multiple nodes, the first and second actions performed to accomplish the related activity.

46. A system for implementing an extensible audit trail in a distributed system, comprising:
means for generating a common schema for recording audit records, the common schema comprising a set of mandatory attribute information and a variable set of system specific attribute information, the common schema further comprising an audit ID that is propagated across multiple nodes; and
means for recording audit records for audit event at nodes in the distributed system, the audit records compliant with the common schema;
wherein the audit ID is for correlating one of the audit records with another of the audit records, to thereby allow an audit to be performed to obtain the one of the audit records and the another of the audit records that are resulted from a related activity.

47. The system of claim 46 in which the common schema is an XML-based schema.

48. The system of claim 46 in which the mandatory attribute information comprises information selected from the group consisting of session identifier, entry identifier, timestamp, user identifier.

49. The system of claim 46, wherein the related activity comprises a first action at one of the multiple nodes and a second action at another of the multiple nodes, the first and second actions performed to accomplish the related activity.

50. A computer program product comprising a computer usable storage medium having executable code to execute a process for performing auditing in a distributed system, the process comprising:
receiving an audit request to obtain a set of interrelated records that are resulted from a related activity;
identifying an audit ID value associated with the audit request, the audit ID value propagated across a plurality of nodes that are interrelated based upon a related activity, in which audit events at the plurality of nodes that are associated with the related activity are recorded as audit records associated with the audit ID value; and
performing an auditing operation by searching for the audit records that are associated with the audit ID value;
wherein the related activity comprises a first action at one of the plurality of nodes and a second action at another of the plurality of nodes, the first and second actions performed to accomplish at least a part of the related activity.

51. A system for performing auditing in a distributed system, comprising:
means for receiving an audit request to obtain a set of interrelated records that are resulted from a related activity;
means for identifying an audit ID value associated with the audit request, the audit ID value propagated across a plurality of nodes that are interrelated based upon a related activity, in which audit events at the plurality of nodes that are associated with the related activity are recorded as audit records associated with the audit ID value; and
means for performing an auditing operation by searching for the audit records that are associated with the audit ID value;
wherein the related activity comprises a first action at one of the plurality of nodes and a second action at another of the plurality of nodes, the first and second actions performed to accomplish at least a part of the related activity.

52. The system of claim 51 in which the audit records are stored in an XML-based format and an XML-compliant tool is employed to access the audit records.

53. A computer program product comprising a computer usable storage medium having executable code to execute a process for implementing an extensible audit trail in a distributed system, the process comprising:
propagating an audit ID value between all nodes involved in an interrelated distributed activity, the all nodes comprising a first node and a second node;
recording a first audit record at the first node with the audit ID value for a first audit event, the first audit event occurring at the first node, the first audit record to be used for auditing the distributed activity;
recording a second audit record at the second node with the audit ID value for a second audit event, the second audit event occurring at the second node, the second audit record to be used for auditing the distributed activity; and
wherein the first audit event is related to the second audit event, and the audit ID value is for correlating the first audit record at the first node with the second audit record at the second node, to thereby allow an audit to be performed to obtain the first and second audit records that are resulted from the related activity.

54. The computer program product of claim 53 in which the audit ID value is uniquely associated with the interrelated distributed activity.

55. The computer program product of claim 53, wherein the related activity comprises a first action at the first node and a second action at the first node, the first and second actions performed to accomplish the related activity.

56. A system for implementing an extensible audit trail in a distributed system, comprising:

means for propagating an audit ID value between nodes involved in an interrelated distributed activity, the nodes comprising a first node and a second node;

means for recording a first audit record at the first node with the audit ID value for a first audit event, the first audit event occurring at the first node, the first audit record to be used for auditing the distributed activity;

means for recording a second audit record at the second node with the audit ID value for a second audit event, the second audit event occurring at the second node, the second audit record to be used for auditing the distributed activity; and wherein the first audit event is related to the second audit event, and the audit ID value is for correlating the first audit record at the first node with the second audit record at the second node, to thereby allow an audit to be performed to obtain the first and second audit records that are resulted from the related activity.

57. The system of claim 56 in which the audit ID value is uniquely associated with the interrelated distributed activity.

58. The system of claim 56, wherein the related activity comprises a first action at the first node and a second action at the first node, the first and second actions performed to accomplish the related activity.

\* \* \* \* \*